(12) United States Patent
Ookawara

(10) Patent No.: US 9,305,210 B2
(45) Date of Patent: Apr. 5, 2016

(54) ELECTRONIC APPARATUS AND METHOD FOR PROCESSING DOCUMENT

(71) Applicant: Kabushiki Kaisha Toshiba, Minato-ku, Tokyo (JP)

(72) Inventor: Yasuhiro Ookawara, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

(21) Appl. No.: 14/258,405

(22) Filed: Apr. 22, 2014

(65) Prior Publication Data

US 2015/0139549 A1    May 21, 2015

Related U.S. Application Data

(60) Provisional application No. 61/906,308, filed on Nov. 19, 2013.

(51) Int. Cl.
*G06K 9/34*      (2006.01)
*G06F 3/041*    (2006.01)
*G06K 9/00*     (2006.01)
*G06F 3/0484*   (2013.01)
*G06F 3/0488*   (2013.01)

(52) U.S. Cl.
CPC .......... *G06K 9/00436* (2013.01); *G06F 3/0484* (2013.01); *G06F 3/04883* (2013.01)

(58) Field of Classification Search
CPC ... G06F 3/0412; G06F 3/04883; G06F 3/033; G06K 9/00436; G06K 9/222; F02B 2075/025; G09B 5/065
USPC .......... 382/189, 176; 715/808, 863, 700, 764, 715/771, 773; 345/7, 156, 173; 348/125, 348/61; 361/600, 679, 807, 809; 368/62, 368/66; 434/365, 408; 704/1, 8
See application file for complete search history.

(56) References Cited

U.S. PATENT DOCUMENTS

| | | | | |
|---|---|---|---|---|
| 8,244,073 | B2* | 8/2012 | Okamura | 382/312 |
| 8,488,885 | B2* | 7/2013 | Cortopassi et al. | 382/186 |
| 8,698,755 | B2* | 4/2014 | Westerman et al. | 345/173 |
| 9,024,901 | B2* | 5/2015 | Miyazaki | 345/173 |
| 2009/0144656 | A1* | 6/2009 | Kwon et al. | 715/808 |
| 2014/0075302 | A1* | 3/2014 | Akashi | 715/268 |
| 2015/0077365 | A1* | 3/2015 | Sasaki | 345/173 |
| 2015/0116278 | A1* | 4/2015 | Oyama et al. | 345/178 |

FOREIGN PATENT DOCUMENTS

| | | | |
|---|---|---|---|
| JP | 07-200152 A | | 8/1995 |
| JP | 2004-280532 | * | 7/2004 |
| JP | 2004-280532 A | | 10/2004 |

* cited by examiner

*Primary Examiner* — Sheela C Chawan
(74) *Attorney, Agent, or Firm* — Knobbe, Martens, Olson & Bear LLP

(57) ABSTRACT

According to one embodiment, an electronic apparatus includes a display controller, a detector and a processor. The display controller displays a document on a screen of a touch screen display, the document including one or more elements corresponding to a first layer and one or more elements corresponding to a second layer. The detector is configured to detect a position and a contact pressure of a first contact on the screen. The processor is configured to delete either a first element corresponding to the first layer or a second element corresponding to the second layer, by using the position and the contact pressure of the first contact.

15 Claims, 12 Drawing Sheets

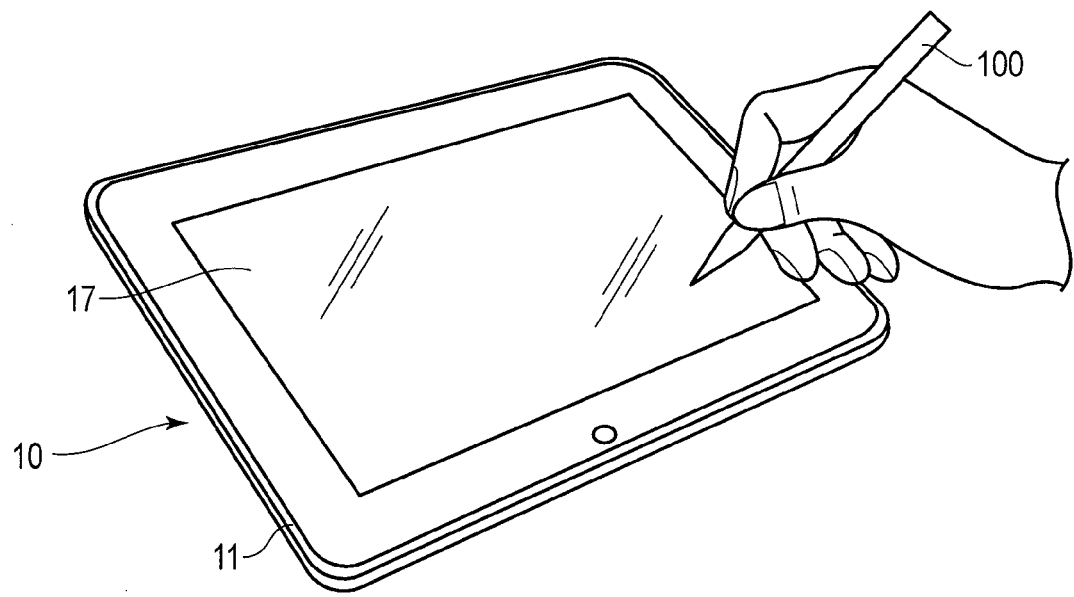
F I G. 1
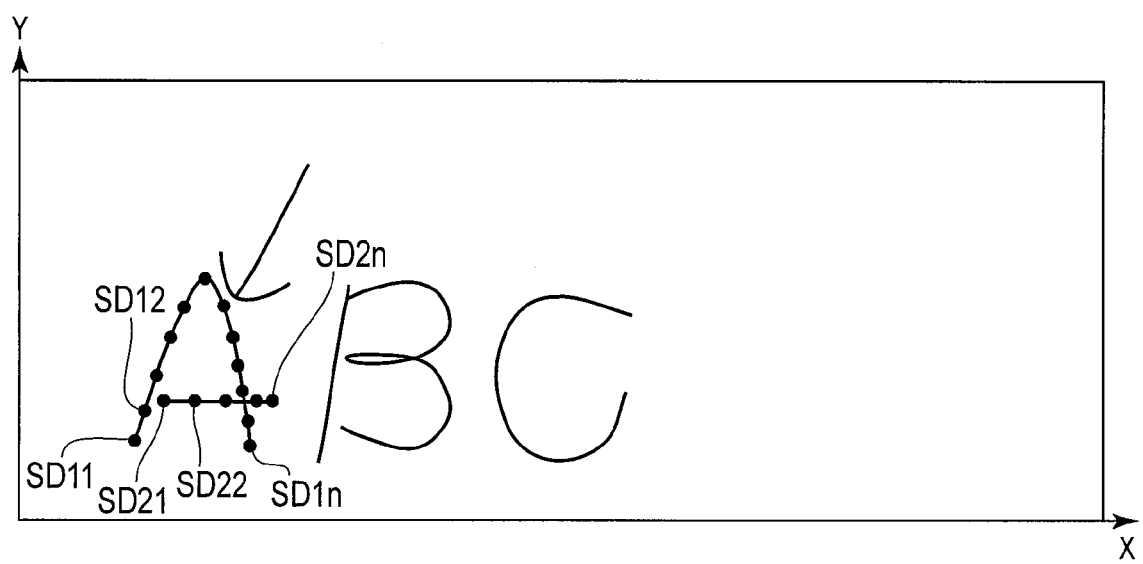
F I G. 2

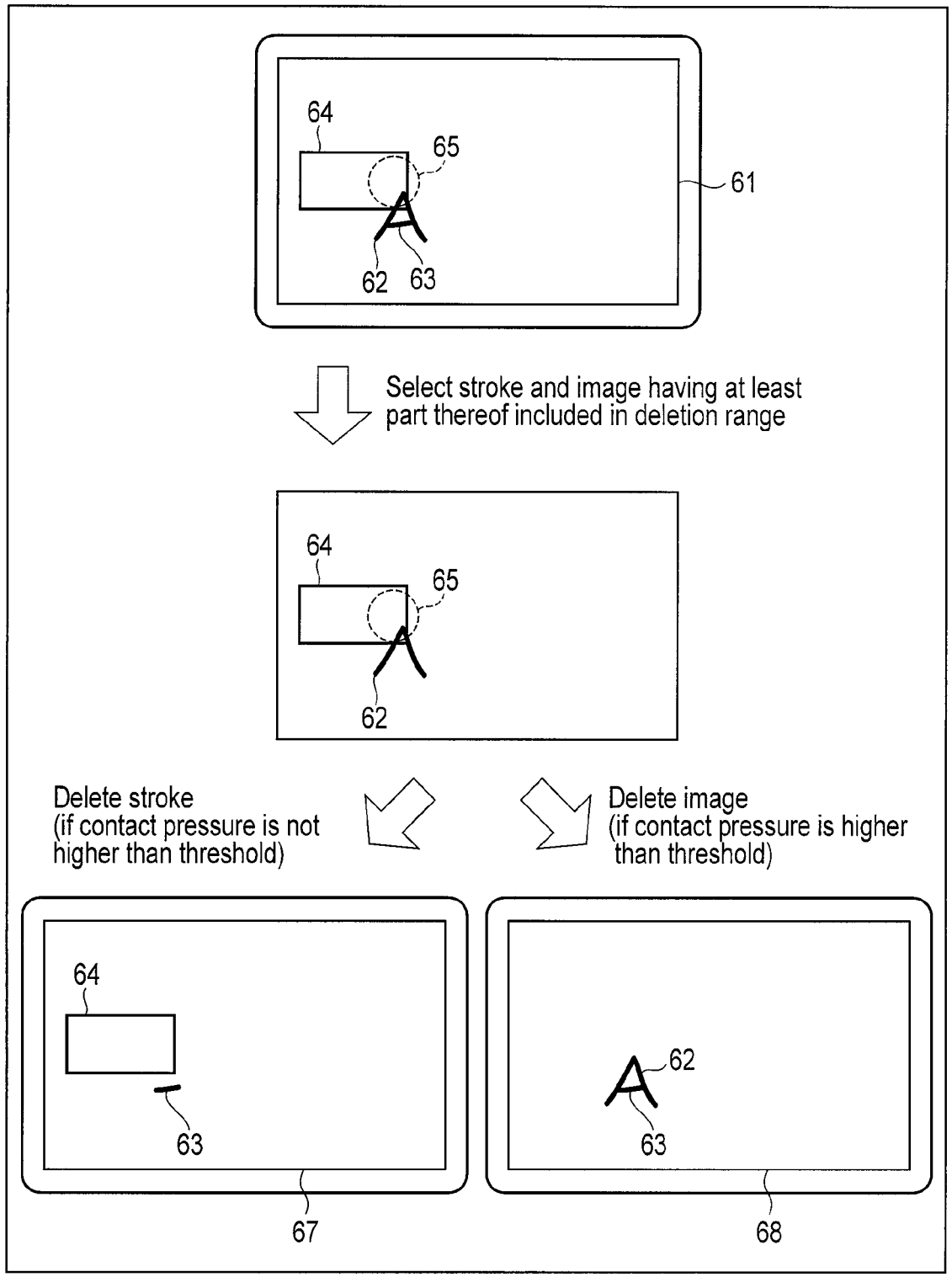
F I G. 5

| Image ID | File name | Position | Size | ... |
|---|---|---|---|---|
| ... | ... | ... | ... | ... |
| ... | ... | ... | ... | ... |
| ⋮ | ⋮ | ⋮ | ⋮ | ⋮ |
FIG. 7
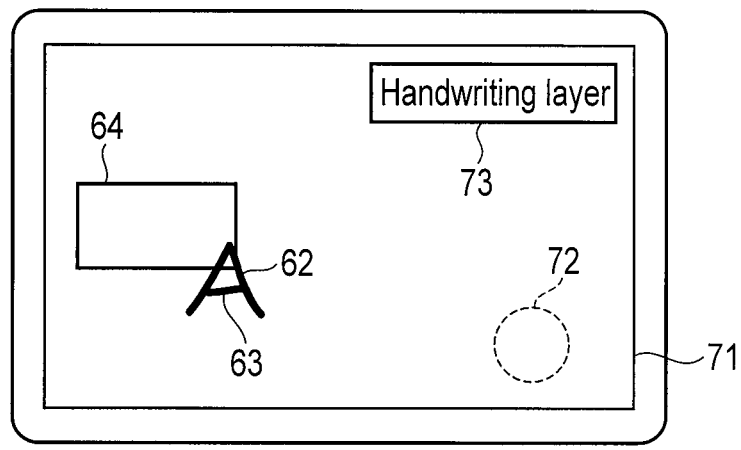
FIG. 8
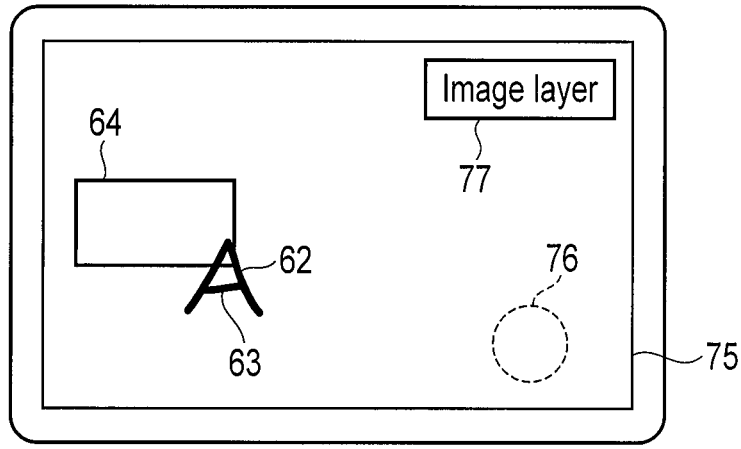
FIG. 9

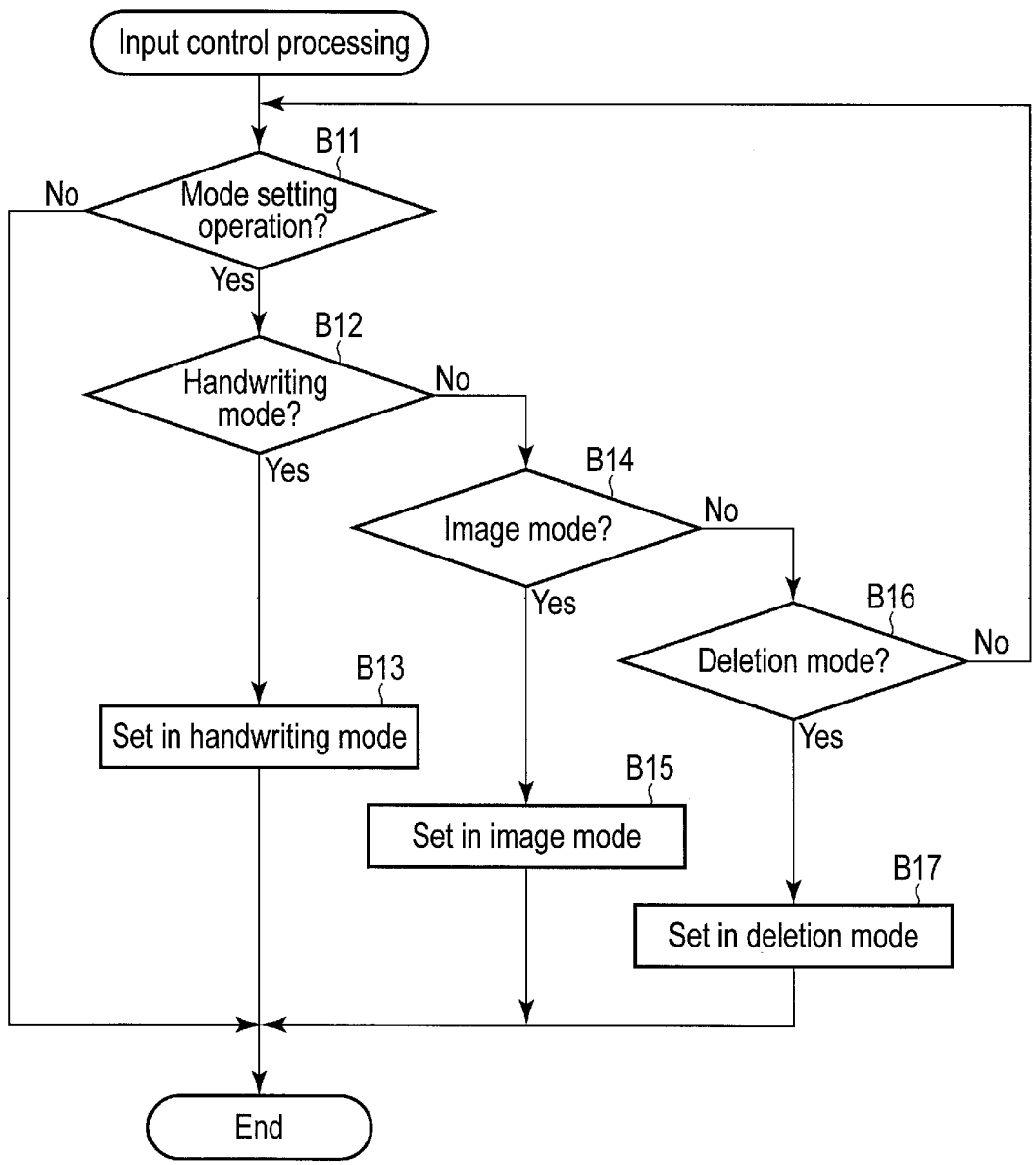
F I G. 13

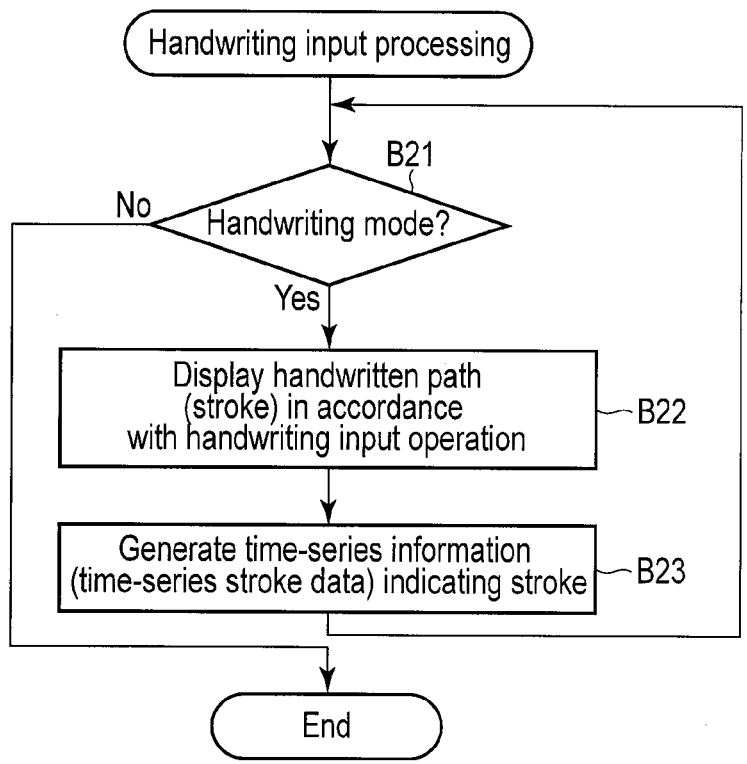
F I G. 14
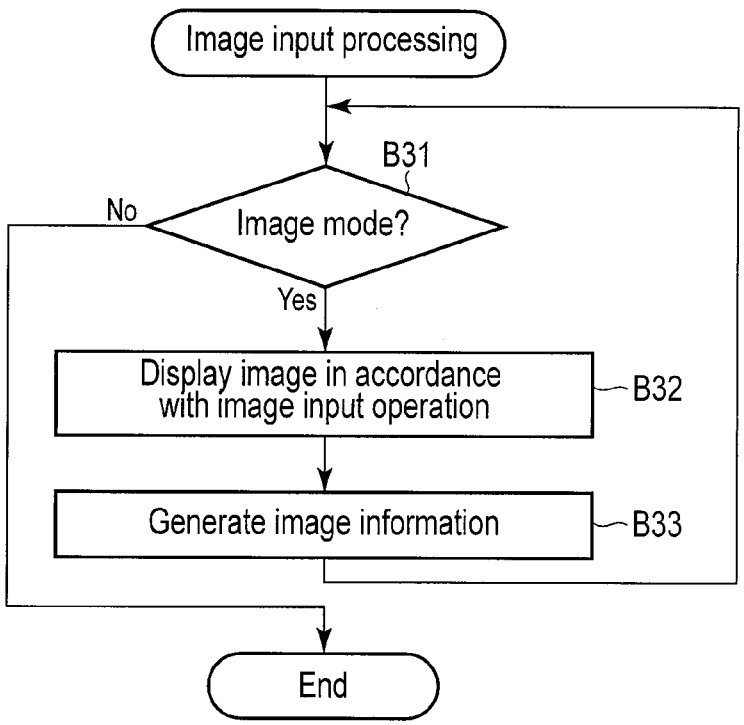
F I G. 15

ELECTRONIC APPARATUS AND METHOD FOR PROCESSING DOCUMENT

CROSS-REFERENCE TO RELATED APPLICATIONS

This application claims the benefit of U.S. Provisional Application No. 61/906,308, filed Nov. 19, 2013, the entire contents of which are incorporated herein by reference.

FIELD

Embodiments described herein relate generally to processing of documents.

BACKGROUND

Various electronic apparatuses, such as tablets, PDAs and smartphones, have recently been developed. These apparatuses include a touch screen display and have a handwriting function for facilitating user's input operations.

Using the electronic apparatuses, users can create documents containing handwritten characters and/or figures as well as texts and images. The users may want to delete part of a created document.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view of the appearance of an electronic apparatus according to an embodiment.

FIG. 2 is a view showing stroke examples of handwriting on the touch screen display of the electronic apparatus of the embodiment.

FIG. 5 is a view for explaining an example of deleting an image or a stroke from a document containing the image and handwritten strokes displayed on the screen of the electronic apparatus of the embodiment.

FIG. 7 is a view showing a configuration example of image information used by the electronic apparatus of the embodiment.

FIG. 8 is a view showing an example in which information indicating a layer as a deletion target is displayed on a document with an image and handwritten strokes by the electronic apparatus of the embodiment.

FIG. 9 is a view showing another example in which information indicating a layer as a deletion target is displayed on a document with an image and handwritten strokes by the electronic apparatus of the embodiment.

FIG. 13 is an exemplary flowchart showing the procedure of input control processing executed by the electronic apparatus of the embodiment.

FIG. 14 is an exemplary flowchart showing the procedure of handwriting input processing executed by the electronic apparatus of the embodiment.

FIG. 15 is an exemplary flowchart showing the procedure of image input processing executed by the electronic apparatus of the embodiment.

DETAILED DESCRIPTION

Figure 3:
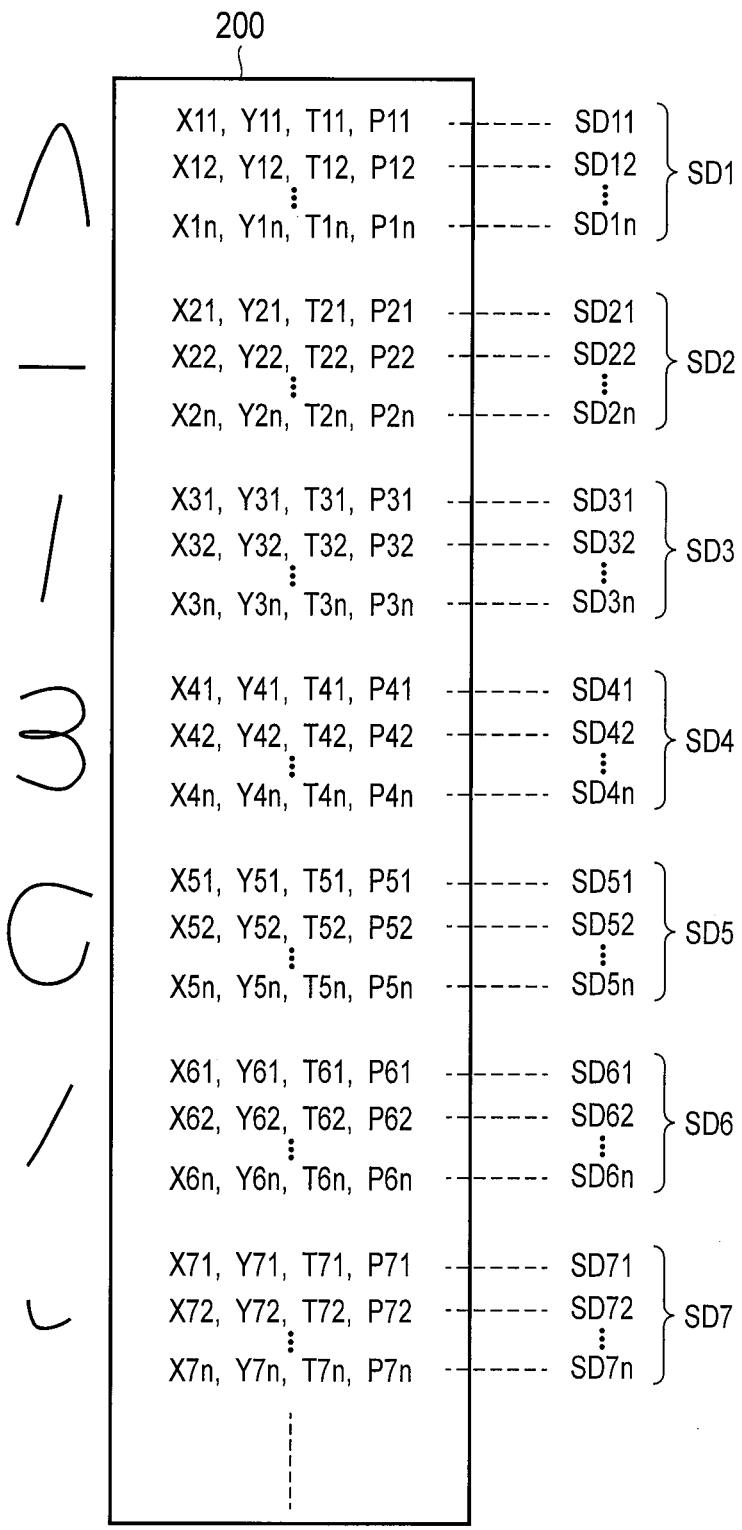
FIG. 3 is an exemplary view for explaining time-series information (stroke data) corresponding to the handwritten stroke of FIG. 2, which is stored in a storage medium by the electronic apparatus of the embodiment.

Various embodiments will be described hereinafter with reference to the accompanying drawings. In general, according to one embodiment, an electronic apparatus includes a display controller, a detector and a processor. The display controller displays a document on a screen of a touch screen display, the document including one or more elements corresponding to a first layer and one or more elements corresponding to a second layer. The detector is configured to detect a position and a contact pressure of a first contact on the screen. The processor is configured to delete either a first element corresponding to the first layer or a second element corresponding to the second layer, by using the position and the contact pressure of the first contact.

FIG. 1 is a perspective view of the appearance of an electronic apparatus according to an embodiment. This electronic apparatus is, for example, a pen-based portable electronic apparatus allowing handwriting input using a pen or finger. The electronic apparatus can be realized as a tablet computer, a notebook-type personal computer, a smartphone, a PDA, etc. In the description below, it is assumed that the electronic apparatus is realized as a tablet computer 10. The tablet computer 10 is a portable electronic apparatus also called a tablet or a slate computer, and includes a main body 11 and a touch screen display 17 as shown in FIG. 1. The touch screen display 17 is attached such that the touch-screen display 17 is laid over the top surface of the main body 11.

The main body 11 has a thin box-shaped housing. In the touch screen display 17, a flat panel display and a sensor, which is configured to detect the contact position of a pen 100 or a finger on the screen of the flat panel display, are incorporated. The flat panel display may be a liquid crystal display device (LCD). As the sensor, an electrostatic capacitance type touch panel, an electromagnetic induction type digitizer, etc., can be used. In the description below, the case is assumed that two kinds of sensors, namely a digitizer and a touch panel, are both assembled in the touch-screen display 17.

Each of the digitizer and the touch panel is provided such that the screen of the flat panel display is covered with them. The touch screen display 17 can detect not only a touch operation on a screen using a finger, but also a touch operation on a screen using a pen 100. The pen 100 may be, for example, an electromagnetic induction pen.

A user can perform, on the touch screen display 17, a handwriting input operation of inputting a plurality of strokes by handwriting, using an external object (the pen 100 or a finger). During a handwriting input operation, the path of movement of the external object (the pen 100 or a finger) on the screen, i.e., the path of a handwriting stroke input by a handwriting input operation is drawn in a real-time, whereby each stroke path is displayed on the screen. The path of the movement of the external object during the time when the object is kept in contact with the screen corresponds to one stroke. A set of strokes, i.e., a number of paths (handwriting paths), constitutes a handwritten character or figure.

In the embodiment, such handwriting strokes (handwritten character or figure) is stored not as image data, but as time-series information that represents a sequence of coordinates of the path of strokes and the order relation of the strokes. As will be described in detail referring to FIG. 3, the time-series information roughly means a set of time-series stroke data corresponding to the respective strokes. Each stroke data may be any type of data, if it expresses a stroke that can be input by handwriting. For instance, each stroke data includes a sequence of coordinates data (time-series coordinates) corresponding to the respective points on a stroke path. The order of stroke data corresponds to the handwritten order of strokes, namely, the order of handwriting.

In a document including handwriting strokes, a text or an object may also be inserted. The text includes, for example, a character (font) corresponding to a character code input through a keyboard. The object includes, for example, an image, a figure, a mark, a sticky note, etc. The handwriting strokes, text and object may be overlapped and displayed (arranged) on the document. The user may further handwrite, for example, a stroke on an image inserted in a document. The user also may delete the displayed handwritten stroke, text or image from the document by a deletion operation on the touch screen display 17.

The tablet computer 10 may read existing arbitrary document data from a storage medium, and display, on the screen, a document corresponding to the document data, i.e., a handwritten document in which paths corresponding to a plurality of strokes indicated by time-series information, characters indicated by character codes, and objects indicated by object data are drawn.

Referring then to FIGS. 2 and 3, a description will be given of the relationship between a stroke (a character, a mark, a figure, a table, etc.) handwritten by the user and time-series information. FIG. 2 shows an example of document handwritten on the touch screen display 17 by using the pen 100, etc.

In this document, another character or figure may well be handwritten on an already handwritten character or figure. In FIG. 2, it is assumed that a character string "ABC" was handwritten in the order of "A", "B" and "C", and then an arrow was handwritten nearby the handwritten character "A".

The handwritten character "A" is expressed by two strokes (a stroke of "Λ" and a stroke of "–"), i.e., two paths, which are handwritten by using the pen 100, etc. The initially handwritten path of the pen 100 in the shape of "Λ", is sampled at, for example, regular time intervals, whereby time-series coordinates SD11, SD12, . . . , SD1n of the stroke in the shape of "Λ" are obtained. Similarly, the subsequently handwritten path of the pen 100 in the shape of "–" is sampled, thereby obtaining time-series coordinates SD21, SD22, . . . , SD2n of the stroke in the shape of "–".

A handwritten character "B" is expressed by two strokes, i.e., two paths, which are handwritten by using the pen 100, etc. A handwritten character "C" is expressed by a single stroke, i.e., a single path, which is handwritten by using the pen 100, etc. The handwritten arrow is expressed by two strokes, i.e., two paths, which are handwritten by using the pen 100, etc.

FIG. 3 shows time-series information 200 corresponding to the document of FIG. 2. The time-series information 200 includes a plurality of stroke data SD1, SD2, . . . , SD7. In the time-series information 200, the stroke data SD1, SD2, . . . , SD7 are chronologically arranged in the order of handwriting, i.e., in the handwritten order of strokes.

In the time-series information 200, the leading two stroke data SD1 and SD2 indicate the two strokes of the handwritten character "A", respectively. The third and fourth stroke data SD3 and SD4 indicate the two strokes constituting the handwritten character "B", respectively. The fifth stroke data SD5 indicates a single stroke constituting the handwritten character "C". The sixth and seventh stroke data SD6 and SD7 indicate the two strokes constituting the handwritten arrow.

Each stroke data includes a sequence of coordinates (time-series coordinates) corresponding to one stroke, i.e., a plurality of coordinates corresponding to a plurality of points on the path of each stroke. In each stroke data, the plurality of coordinates are arranged in the order in which the strokes are handwritten chronologically. For instance, regarding the handwritten character "A," the stroke data SD1 includes a sequence of coordinates data (time-series coordinates) corresponding to the points on the stroke path in the shape of "Λ" in the handwritten character "A," i.e., n coordinates data SD11, SD12, . . . , SD1n. The stroke data SD2 includes a sequence of coordinates data corresponding to the points on the stroke path in the shape of "–" in the handwritten character "A," i.e., n coordinates data SD21, SD22, . . . , SD2n. The number of coordinates data may vary between different stroke data.

Each coordinates data indicates an X coordinate and a Y coordinate corresponding to one point in a corresponding path. For instance, the coordinates data SD11 indicates the X coordinate (X11) and the Y coordinate (Y11) of the initial point of the stroke in the shape of "Λ". The coordinates data SD1n indicates the X coordinate (X1n) and the Y coordinate (Y1n) of the final point of the stroke in the shape of "Λ".

Further, each coordinates data may include timestamp information T corresponding to a time point at which the point corresponding to the coordinates is handwritten. The time point of the handwriting may be an absolute time (e.g., year, month, date, time, minute, second) or a relative time with respect to a certain reference time. For instance, the absolute time (e.g., year, month, date, time, minute, second) of the start of handwriting of a stroke may be added to each stroke data as timestamp information, and a relative time indicating the difference from the absolute time may be added as timestamp information to each coordinates data in each stroke data. By using time-series information obtained by adding timestamp information T to each coordinate data, the temporal relationship between strokes can be more accurately expressed.

In addition, each coordinates data may include pressure P (hereinafter also referred to as contact pressure) under which an external object (such as the pen 100) touches the screen when the point corresponding to the coordinates is handwritten.

In the embodiment, as described above, a handwritten stroke is stored not as image or character recognition result, but as time-series information 200 formed of a set of time-series stroke data, and therefore handwritten characters and figures can be treated regardless of the language. Accordingly, the structure of the time-series information 200 of the embodiment can be used in common between various countries of different languages.

Figure 4:
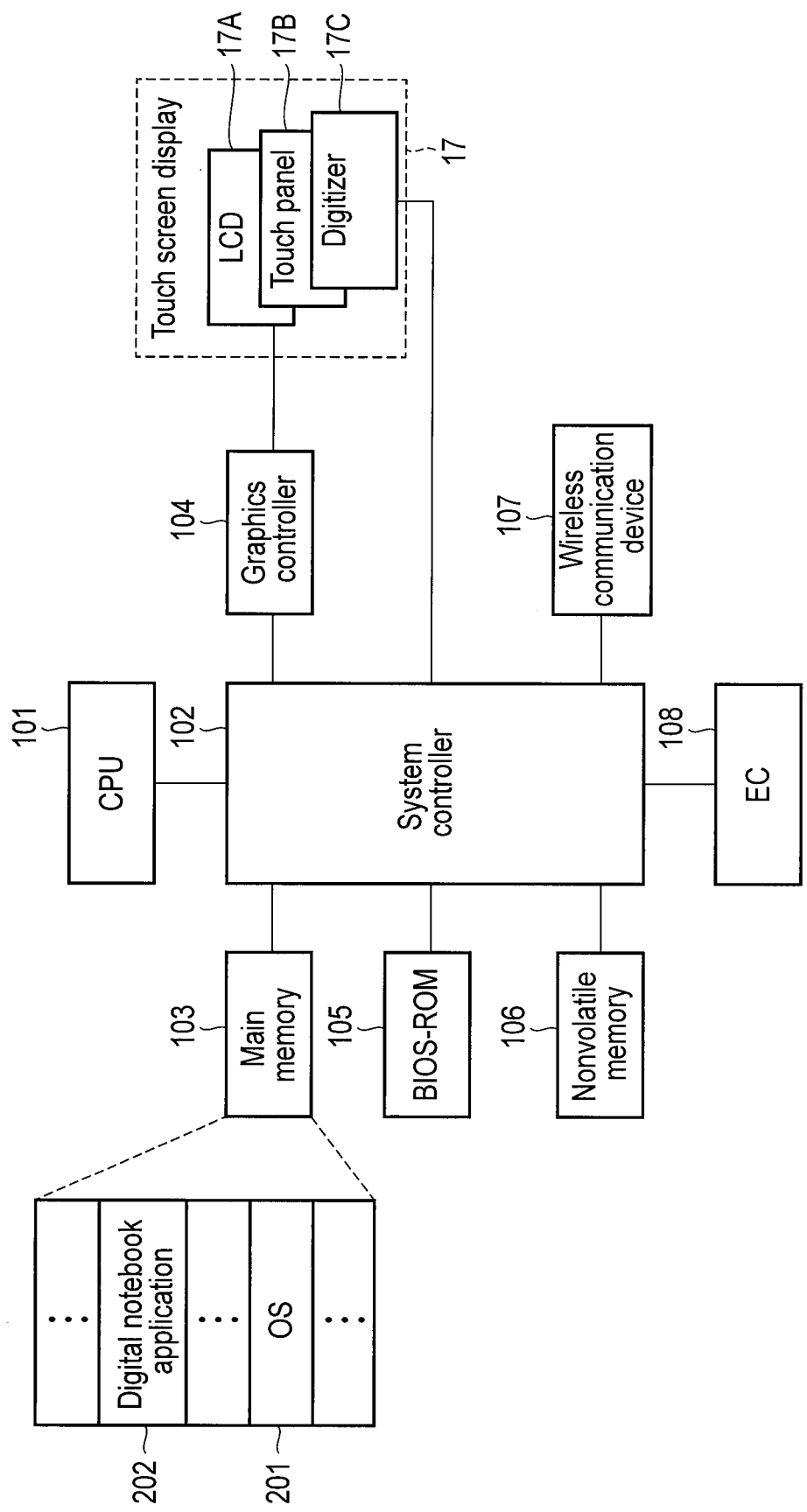
FIG. 4 is an exemplary block diagram showing a system configuration of the electronic apparatus of the embodiment.

FIG. 4 is a block diagram showing the system configuration of the tablet computer 10.

As shown in FIG. 4, the tablet computer 10 includes a CPU 101, a system controller 102, a main memory 103, a graphics controller 104, a BIOS-ROM 105, a nonvolatile memory 106, a wireless communication device 107, an embedded controller (EC) 108, etc.

The CPU 101 is a processor for controlling the operations of various components in the tablet computer 10. The CPU 101 executes various types of software loaded from the nonvolatile memory 106 to the main memory 103. The various types of software include an operating system (OS) 201 and various application programs. The application programs include a digital notebook application program 202. The digital notebook application program 202 has a function of creating and displaying the above document, a function of editing the document, etc.

The CPU 101 also executes a basic input output system (BIOS) stored in the BIOS-ROM 105. The BIOS is a program for hardware control.

The system controller 102 is a device for connecting between the local bus of the CPU 101 and various components. The system controller 102 contains a memory controller which access-controls the main memory 103. The system controller 102 has a function of communicating with the graphics controller 104 via, for example, a serial bus of PCI EXPRESS standards.

The graphics controller 104 is a display controller for controlling an LCD 17A used as a display monitor for the tablet computer 10. A display signal generated by the graphics controller 104 is sent to the LCD 17A. Based on the display signal, the LCD 17A displays a screen image. A touch panel 17B and a digitizer 17C are provided on the LCD 17A. The touch panel 17B is an electrostatic capacitance type pointing device for inputting data on the screen of the LCD 17A. The position and movement of a finger on the screen are detected by the touch panel 17B. The digitizer 17C is an electromagnetic induction type pointing device for inputting data on the screen of the LCD 17A. The position, movement and contact pressure on the screen which is contacted by the pen 100 are detected by the digitizer 17C.

The wireless communication device 107 is a device configured to perform wireless communication, such as wireless LAN communication, 3G mobile communication, etc. The EC 108 is a one-chip microcomputer including an embedded controller for power management. The EC 108 has a function of turning on and off the tablet component 10 in response to an operation of a power button by the user.

As described above, the digital notebook application 202 has a function of creating and displaying a document, a function of editing the document, etc. More specifically, the digital notebook application 202 draws, on a document, an element such as a handwriting stroke, an object, a text, etc., using the function of creating and displaying a document. In accordance with a handwriting input operation on the touch screen display 17, the digital notebook application 202 draws a handwritten path (stroke) on a document. Further, in accordance with an object input operation (e.g., an operation of selecting an image file and designating the insertion position) on the touch screen display 17, the digital notebook application 202 inserts an object (e.g., an image, a figure, a sticky note, etc.) in a document. Furthermore, in accordance with a keyboard input operation (input operation using a software keyboard or a hardware keyboard), the digital notebook application 202 inserts a text (a font corresponding to a character code) in a document.

In addition, the digital notebook application 202 edits elements (a handwritten stroke, an object or a text) using a document editing function. For instance, the digital notebook application 202 deletes (erases) elements on a document in accordance with a deletion operation (erasure operation) on the touch screen display 17. The deletion operation is, for example, an input operation of handwriting a point or stroke for designating a to-be-deleted element on the touch screen display 17.

Thus, the user may perform not only handwriting a stroke on a document but also inserting an object or a text, utilizing the digital notebook application 202. The handwritten stroke, the object and the text may be drawn on the document to overlap each other. The user may further handwrite a stroke on, for example, the image (object) inserted in the document.

The user may also delete the handwritten stroke, the object or the text from the document. However, if two or more elements overlap each other or are located close to each other, an input operation on the touch screen display 17 to designate the area of one of the elements in order to delete only the one element (e.g., an operation of tracing the contour of the one element) may well be complex or difficult.

In the example shown in FIG. 5, handwritten strokes 62 and 63 and an image 64 are included in a document 61, and part of the handwritten stroke 62 overlaps the image 64. In this document 61, both the handwritten stroke 62 and the image 64 may be deleted in accordance with designating a deletion range 65. However, if the user wants to delete either the handwritten stroke 62 or the image 64, it is necessary to carefully designate the deletion range in the area where the handwritten stroke 62 and the image 64 overlap each other, which is very troublesome to the user.

Further, a method is also possible in which a deletion range is designated after either the layer of the handwritten strokes 62 and 63 or that of the image 64 is selected as a deletion target layer. For instance, a button for selecting either the layer of the handwritten strokes 62 and 63 or that of the image 64 is displayed on the screen. The user selects a deletion target layer using the button, and then designates the deletion range. In this method, however, when a plurality of elements drawn on a plurality of layers are deleted, it is necessary to repeatedly perform operations of layer selection and deletion range designation, which may degrade the operability.

To avoid this, in the embodiment, elements to be deleted are selected from a document based on the contact pressure on the screen during a deletion operation, namely, based on the pressure occurring when an external object (e.g., the pen 100) is brought into contact with the screen. In the embodiment, by using, for example, the position and the contact pressure of a first contact on the screen, either one or more elements corresponding to a first layer, or one or more elements corresponding to a second layer, are deleted. Namely, using the contact pressure of the first contact against the screen, it is selected whether one or more elements corresponding to the first layer are to be deleted, or whether one or more elements corresponding to the second layer are to be deleted, and using the position of the first contact, it is specified which one of the one or more elements corresponding to the selected layer are to be deleted.

Referring then to FIG. 5, a description will be given of an example where the element to be deleted is selected. Where a document 61 including a plurality of handwritten strokes 62 and 63 and an image 64 is displayed on the touch screen display 17, when a deletion operation has been performed on the document 61, a deletion range 65 corresponding to the deletion operation is set. The deletion operation is, for example, an operation of touching the screen of the touch screen display 17, and is expressed by the coordinates indicating the touched (contact) position on the screen, and the contact pressure against the screen that occurs at the contact position. The deletion range 65 is a predetermined range (e.g., a circle of a predetermined radius) centered on the contact position (coordinates) corresponding to the deletion operation.

Subsequently, elements, at least part of which falls within the deletion range 65, i.e., the handwritten stroke 62 and the image 64, are selected from the document 61. After that, based on the contact pressure corresponding to the deletion operation, either the handwritten stroke 62 or the image 64 is deleted. For instance, if the contact pressure indicated by the deletion operation is not higher than a first threshold, the handwritten stroke 62 is deleted as shown in a document 67. Further, if the contact pressure is higher than the first threshold, the image 64 is deleted as shown in a document 68.

Since thus, the type of the element to be deleted can be switched in accordance with the contact pressure against the screen during the deletion operation, the user does not have to, for example, press a button for selecting the type of an element as the deletion target (i.e., the layer of a deletion target) and can simultaneously designate the deletion range and the type (layer) of the deletion target by a deletion operation on the touch screen display 17.

Figure 6:
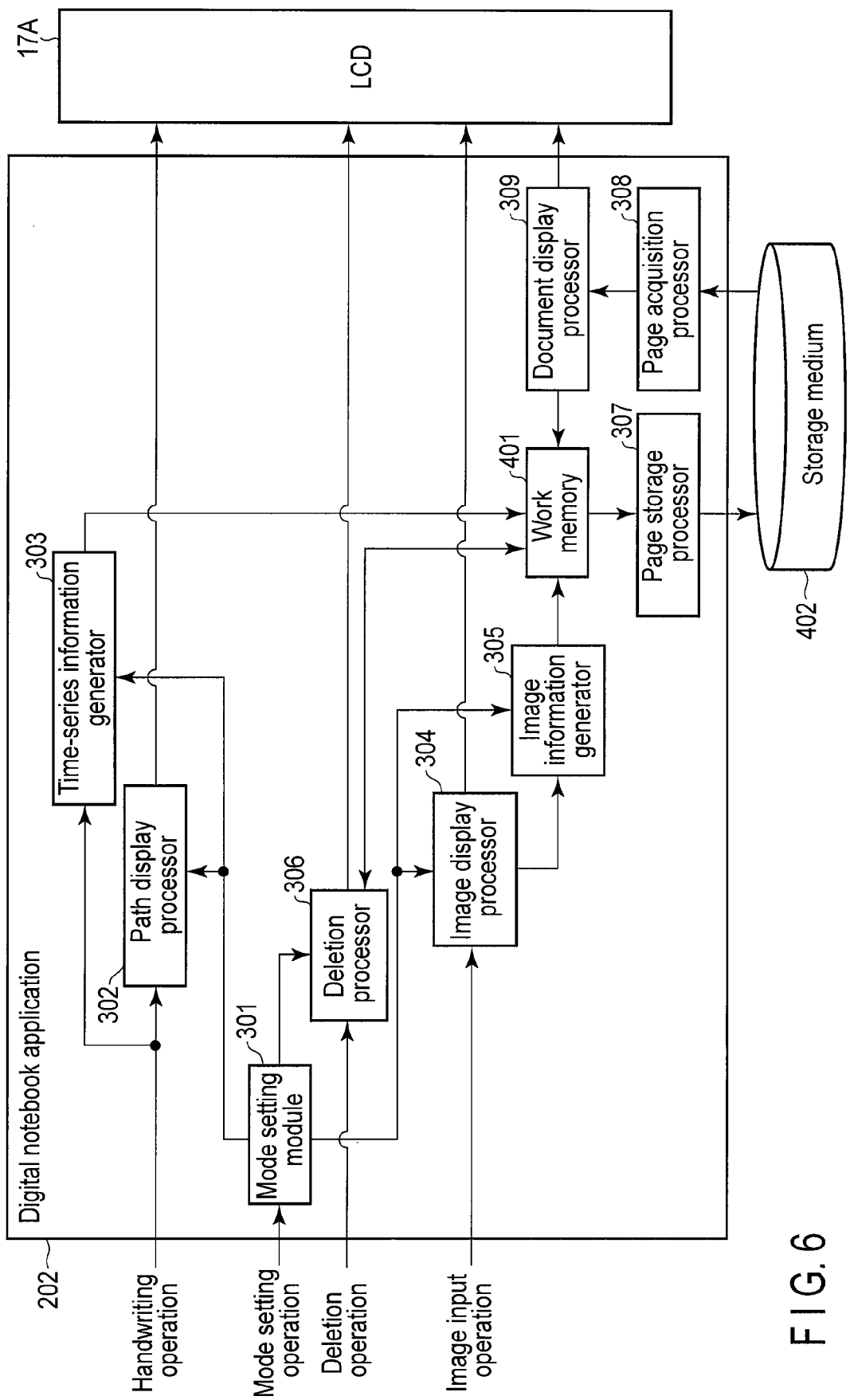
FIG. 6 is an exemplary block diagram showing a functional configuration of a handwriting note application program executed by the electronic apparatus of the embodiment.

FIG. 6 shows the functional configuration of the digital notebook application program 202. The digital notebook application program 202 executes generation, display and edit, etc. of a document by using time-series information (stroke data) input by an operation using the touch screen display 17.

The digital notebook application 202 includes, for example, a mode setting module 301, a path display processor 302, a time-series information generator 303, an image display processor 304, an image information generator 305, a deletion processor 306, a page storage processor 307, a page acquisition processor 308, and a document display processor 309.

The touch screen display 17 is configured to detect occurrence of an event, such as "touch", "move (slide)" and "release". "Touch" is an event indicating that an external object is brought into contact with the screen. "Move (slide)" is an event indicating that the contact position of the external object has moved while the external object is kept in contact with the screen. "Release" is an event indicating that the external object is separated from the screen.

The mode setting module 301 receives the events "touch" and "release" generated by the touch screen display 17, thereby detecting a mode setting operation. The "touch" event includes the coordinates of the contact position and the contact pressure in the contact position. The "release" event includes the coordinates of the position in which the external object is separated from the screen, and the contact pressure (the contact pressure immediately before the separation). For instance, when the "touch" event (or, the "touch" event and "release" event) is occurring in a button for setting the mode displayed on the screen, the mode setting module 301 sets the digital notebook application 202 (tablet computer 10) in the mode corresponding to the button.

The mode, in which the digital notebook application 202 is set, is a handwriting mode, an image mode or a deletion mode. In the handwriting mode, a path (stroke) corresponding to the handwriting input operation on the touch screen display 17 is drawn on a document. In the image mode, an image (object) is inserted in the document in accordance with an image input operation on the touch screen display 17. In the deletion mode, an element (for example, a stroke, an image, etc.) is deleted from the document in accordance with a deletion operation on the touch screen display 17. The mode, in which the digital notebook application 202 is set, may include another mode, such as a text mode in which a text corresponding to a keyboard input operation is inserted.

Assume here that three buttons for setting the digital notebook application 202 in, for example, the handwriting mode, the image mode or the deletion mode are displayed on the touch screen display 17. When one of the three buttons has been pressed (i.e., when the "touch" event has occurred in the area corresponding to one of the buttons), the mode setting module 301 sets the digital notebook application 202 in the mode corresponding to the pressed button.

The mode setting module 301 may inform each element of the digital notebook application 202 of the set mode. If the digital notebook application 202 is set in the handwriting mode, the mode setting module 301 informs the path display processor 302 and the time-series information generator 303 of the start of the handwriting mode. If the digital notebook application 202 is set in the image mode, the mode setting module 301 informs the image display processor 304 and the image information generator 305 of the start of the image mode. In addition, if the digital notebook application 202 is set in the deletion mode, the mode setting module 301 informs the deletion processor 306 of the start of the deletion mode.

If the digital notebook application 202 is set in the handwriting mode, the path display processor 302 and the time-series information generator 303 receive the "touch", "move (slide)" or "release" events generated by the touch screen display 17, thereby detecting the handwriting operation. The "touch" event includes the coordinates of the contact position and the contact pressure in the contact position. The "move (slide)" event includes the coordinates of a contact position as destination, and the contact pressure in the destination contact position. The "release" event includes the coordinates of the position in which the external object is separated from the screen, and the contact pressure (contact pressure immediately before the separation). Thus, the path display processor 302 and the time-series information generator 303 receive, from the touch screen display 17, a sequence of coordinates corresponding to the path of the movement of the contact position.

The path display processor 302 receives a sequence of coordinates from the touch screen display 17, and displays the path of each stroke handwritten by a handwriting input operation using the pen 100, etc., based on the received sequence of coordinates. By the path display processor 302, the path of the pen 100 made while the pen 100 is kept in contact with the screen, namely, a stroke is drawn on the screen of the LCD 17A.

The time-series information generator 303 receives the above-mentioned coordinates sequence output from the touch screen display 17, and generates time-series information (stroke data) having the structure described in detail referring to FIG. 3, based on the coordinates sequence. The time-series information, i.e., coordinates, contact pressure and timestamp information corresponding to each point of a stroke may be temporarily stored in a work memory 401.

Further, if the digital notebook application 202 is set in the image mode, the image display processor 304 and the image information generator 305 perform processing of inserting a user's designated image in the position on the document designated by the user. The image display processor 304 receives the "touch", "move (slide)" or "release" events generated by the touch screen display 17, thereby detecting an image input operation. The image input operation includes, for example, an operation of designating an image to be inserted in a document, and an operation of designating a position in which the image is inserted.

For instance, the image display processor 304 displays a list of image files on the screen, receives the coordinates corresponding to a contact position on the list from the touch screen display 17, and selects, from the list, the image file corresponding to the received coordinates. Subsequently, the image display processor 304 receives, from the touch screen display 17, the coordinates corresponding to the contact position on the document, and displays an image corresponding to the selected image file at the coordinates (displays, for example, the image so that the upper left end of the image is positioned at the coordinates). Alternatively, the image display processor 304 may receive, from the touch screen display 17, a sequence of coordinates corresponding to the movement of the contact position on the document, and display an image in an area (e.g., a rectangular area) corresponding to the received sequence of coordinates.

The image information generator 305 generates image information based on the image file selected by the image display processor 304, and the position in which the image corresponding to the image file is displayed. The generated image information may be temporarily stored in the work memory 401.

FIG. 7 shows a configuration example of image information. The image information includes one or more entries corresponding to one or more images inserted in a document. Each entry includes, for example, image ID, a file name, a position, and a size.

In an entry corresponding to a certain image, the "image ID" indicates identification information given to the image. The "file name" indicates a file name (or file path) corresponding to the image. The "position" indicates the position (coordinates) on the document in which the image is inserted. The "size" indicates the size with which the image is displayed.

In the above-described image mode, various objects, such as a graphics object and a sticky note object, may be inserted instead of the image.

If the digital notebook application 202 is set in the deletion mode, the deletion processor 306 performs processing for deleting, from the document, the element designated by the user (e.g., a handwritten stroke, an object, a text, etc.). The deletion processor 306 receives a "touch", "move (slide)" or "release" event from the touch screen display 17, thereby detecting a deletion operation. As mentioned above, each event includes the coordinates of a contact position and the contact pressure in the contact position.

The deletion processor 306 receives, from the touch screen display 17, the coordinates and the contact pressure corresponding to the contact position, and sets a deletion range using the coordinates. The deletion range is, for example, a circular range of a predetermined radius centered on the coordinates. The deletion processor 306 detects elements, at least part of which falls within the deletion range, in elements on the document. More specifically, the deletion processor 306 detects, for example, a handwritten stroke and an image, at least part of which falls within the deletion range, in handwritten strokes and images on the document.

The deletion processor 306 determines the type of a deletion target element based on the contact pressure corresponding to the deletion operation, and deletes an element of the determined type from the elements, at least part of which falls within the deletion range. For example, the deletion processor 306 deletes an element of a first type from the elements, at least part of which falls within the deletion range if the received contact pressure is not higher than a first threshold, and deletes an element of a second type from the elements, at least part of which falls within the deletion range if the received contact pressure is higher than the first threshold.

More specifically, if the contact pressure is not higher than the first threshold, the deletion processor 306 deletes, from a document (screen), a handwritten stroke (an element of the first type) having at least part thereof included in the deletion range, and deletes time-series information (stroke data) corresponding to the handwritten stroke from the work memory 401. In contrast, if the contact pressure is higher than the first threshold, the deletion processor 306 deletes, from the document, an image (an element of the second type) having at least part thereof included in the deletion range, and deletes image information (an entry of image information) corresponding to the image from the work memory 401.

The document may be defined as including layers corresponding to respective element types. The document includes a plurality of layers, such as a handwriting layer in which a handwritten stroke is drawn, an image layer in which an image (object) is drawn, and a text layer in which a text is drawn. If a document includes a first layer corresponding to one or more elements, and a second layer corresponding to one or more elements, the deletion processor 306 deletes either a first element corresponding to the first layer, or a second element corresponding to the second layer, using the position and the contact pressure of a first contact (deletion operation) on the screen.

More specifically, firstly, the deletion processor 306 selects a layer of a deletion target based on the contact pressure of the first contact. Namely, the deletion processor 306 selects either deleting one or more elements corresponding to the first layer, or deleting one or more elements corresponding to the second layer, by using the contact pressure of the first contact, and specifies which one of the one or more elements corresponding to the selected layer is to be deleted.

For instance, the deletion processor 306 determines the one or more elements corresponding to the first layer to be deletion targets if the contact pressure is not higher than a first threshold, and determines the one or more elements corresponding to the second layer to be deletion targets if the contact pressure is higher than the first threshold. Alternatively, the deletion processor 306 may determine the one or more elements corresponding to the second layer as deletion targets, if the first layer is positioned on the front side compared to the second layer and the contact pressure is higher than a threshold. After that, the deletion processor 306 determines a deletion range based on the coordinates of the position of the first contact, and deletes, from the document, an element (or elements) which is included in the one or more elements as the deletion targets, and at least part of which falls within the deletion range.

Assume here that the document includes a handwriting layer (first layer) corresponding to one or more handwritten strokes, and an image layer (second layer) corresponding to one or more images (objects). If the contact pressure of the first contact is not higher than a first threshold, the deletion processor 306 selects deleting one or more handwritten strokes corresponding to the handwriting layer, and deletes a first stroke of the one or more handwritten strokes, by using the position of the first contact. In contrast, if the contact pressure of the first contact is higher than the first threshold, the deletion processor 306 selects deleting one or more images corresponding to the image layer, and deletes a first image of the one or more images, by using the position of the first contact.

More specifically, if the contact pressure of the first contact is not higher than the first threshold, the deletion processor 306 determines the one or more handwritten strokes (first type elements) to be deletion targets, deletes, from the document, a handwritten stroke, at least part of which falls within the deletion range, and deletes time-series information (stroke data) which corresponds to the handwritten stroke and is stored in the work memory 401. In contrast, if the contact pressure of the first contact is higher than the first threshold, the deletion processor 306 determines the one or more images (second type elements) to be deletion targets, deletes, from the document, an image, at least part of which falls within the deletion range, and deletes image information (an entry of image information) which corresponds to the image and is stored in the work memory 401.

Further, if the document includes three or more layers, thresholds corresponding to the number of the layers are set. For instance, if three layers are included in the document, two thresholds are set to determine to which one of the three layers one or more elements to be selected correspond. For example, the deletion processor 306 determines one or more elements corresponding to a first layer to be deletion targets if the contact pressure of the first contact is not higher than a first threshold, determines one or more elements corresponding to a second layer to be deletion targets if the contact pressure of the first contact is higher than the first threshold and not higher than a second threshold, and determines one or more elements corresponding to a third layer to be deletion targets if the contact pressure is higher than the second threshold (the first threshold is less than the second threshold).

If the document includes a number of layers (includes e.g., five layers), it is difficult for the user to perform a deletion operation with the contact pressure finely controlled, so as to select one or more elements corresponding to one of the layers. In this case, the deletion processor 306 detects an element (elements), at least part of which is included in a deletion range determined based on the position corresponding to the deletion operation, selects a layer as a deletion target not from all layers but from one or more layers corresponding to the detected element(s), based on the contact pressure corresponding to the deletion operation, and determines one or more elements corresponding to the selected layer to be deletion target elements. Namely, the deletion processor 306 selects a layer as a deletion target not from all layers included in the document, but from the layers corresponding to the position in which the user is performing a deletion operation. It is assumed that even when the document includes a number of layers, a less number (e.g., two) of layers may overlap each other in a certain position. By virtue of this layer selection, the user can select a layer as a deletion target without fine adjustment of the contact pressure.

Although in the example described above, the entire portion of the element, at least part of which falls within the deletion range, is deleted, only the part of this element that falls within the deletion range may be deleted. In this case, the deletion processor 306 can sequentially delete the parts of handwritten strokes or images which fall within the deletion range, like a "rubber eraser" tool in a paint application program.

The page storage processor 307 stores the generated (edited) time-series information and image information (i.e., the time-series information and image information temporarily stored in the work memory 401) in a storage medium 402 as document data. The storage medium 402 is, for example, a storage device in the tablet computer 10.

The page acquisition processor 308 reads arbitrary existing document data from the storage medium 402. The read document data is sent to a document display processor 309. The document display processor 309 analyzes the document data and displays a document (page) on the screen based on the analysis result, the document including paths of stroke indicated by the time-series information, and images indicated by the image information.

When the digital notebook application 202 is set in the deletion mode, the deletion processor 306 may report a layer of a deletion target (i.e., one or more elements corresponding to the layer of a deletion target) corresponding to the current contact pressure received from the touch screen display 17. Namely, based on the contact pressure of the first contact, the deletion processor 306 selects either deleting one or more elements corresponding to the first layer, or deleting one or more elements corresponding to the second layer, and reports the one or more elements selected to be deleted.

Referring now to FIGS. 8 and 9, an example of a screen of reporting a layer as a deletion target will be described. Assume here that strokes 62 and 63 have been handwritten and an image 64 has been inserted in the document displayed on the screen, namely, that the document contains a handwriting layer including the strokes 62 and 63, and an image layer including the image 64.

In the document 71 shown in FIG. 8, a deletion range 72 corresponding to a deletion operation by the user is set, and text information "handwriting layer" 73, which indicates that the deletion target layer is the handwriting layer, is displayed when the contact pressure corresponding to the deletion operation is not higher than a first threshold.

Similarly, in the document 75 shown in FIG. 9, a deletion range 76 corresponding to a deletion operation by the user is set, and text information "image layer" 77, which indicates that the deletion target layer is the image layer, is displayed when the contact pressure corresponding to the deletion operation is higher than the first threshold.

The information 73 and 77 are not limited to text of the names of the layers, but may be marks (images) expressing the layers, or a combination of them.

Figure 10:
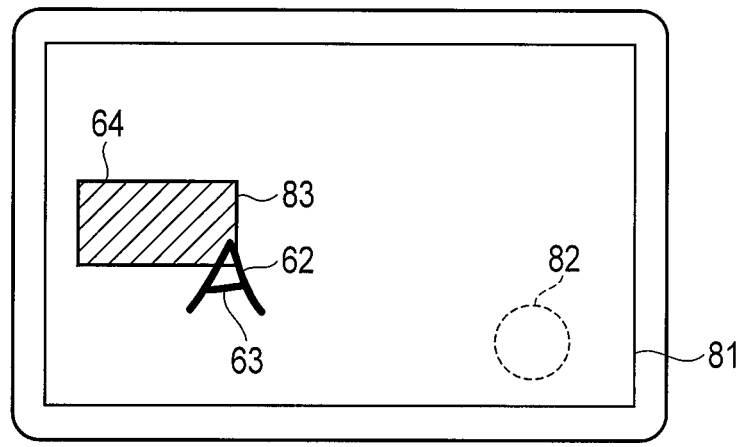
FIG. 10 is a view showing an example of changing the display form of a layer as a deletion target included in a document that contains an image and handwritten strokes and is displayed by the electronic apparatus of the embodiment.
Figure 11:
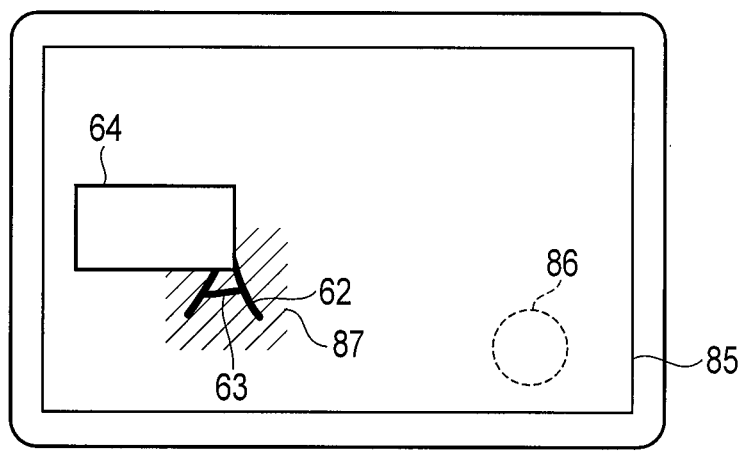
FIG. 11 is a view showing another example of changing the display form of a layer as a deletion target included in a document that contains an image and handwritten strokes and is displayed by the electronic apparatus of the embodiment.

Referring then to FIGS. 10 and 11, examples of screens in which the deletion target layer is displayed such that the deletion target layer is discriminated from the other layer(s) will be described. The deletion processor 306 displays, for example, a deletion target layer (element(s) corresponding to the deletion target layer) in a first display form, and displays the layer(s) other than the deletion target layer (element(s) corresponding to the layer(s) other than the deletion target layer) in a second display form different from the first display form. The display forms are defined by, for example, color, brightness, transparency, etc.

In the document 81 shown in FIG. 10, a deletion range 82 corresponding to a deletion operation by the user is set, and a handwriting layer (i.e., the strokes 62 and 63 in the handwriting layer) as a deletion target is displayed highlighted compared to an image layer (i.e., an image 64 in the image layer) that is not a deletion target if the contact pressure corresponding to the deletion operation is not higher than a first threshold. Namely, the deletion processor 306 has darkened the image 64 in the image layer that is not a deletion target.

In the document 85 shown in FIG. 11, a deletion range 86 corresponding to a deletion operation by the user is set, and an image layer (i.e., the image 64 corresponding to the image layer) as a deletion target is displayed highlighted compared to a handwriting layer (i.e., the strokes 62 and 63 corresponding to the handwriting layer) that is not a deletion target if the contact pressure corresponding to the deletion operation is higher than the first threshold. Namely, the deletion processor 306 has darkened the strokes 62 and 63 corresponding to the handwriting layer that is not a deletion target.

Instead of darkening the layer that is not a deletion target, the layer as the deletion target may be highlighted. Further, the layer that is not a deletion target may be darkened, and the layer as the deletion target may be highlighted.

By virtue of the above notification (display), the user can confirm which layer (element) is targeted by the contact pressure corresponding to the current deletion operation. The user can also attempt to adjust the contact pressure to delete a desired layer, in an area (blank area), such as a deletion range 82 or 86, on the document in which no elements are drawn.

Figure 12:
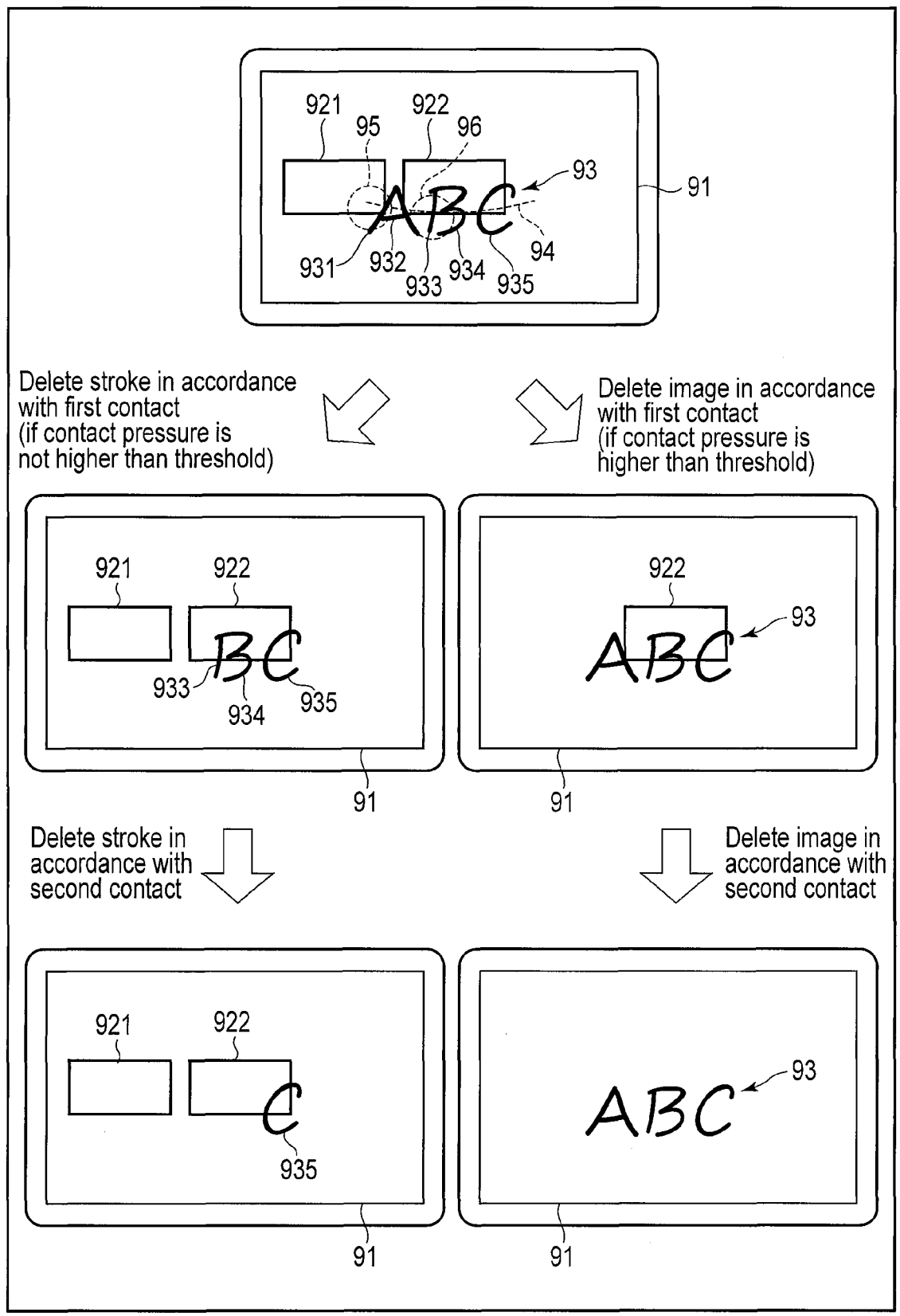
FIG. 12 is a view for explaining another example of deleting an image or a stroke from a document containing the image and handwritten strokes displayed on the screen by the electronic apparatus of the embodiment.

FIG. 12 shows an example in which a plurality of images or a plurality of handwritten strokes are deleted in accordance with the strokes corresponding to a deletion operation.

In the example of FIG. 12, a document 91 containing a handwriting layer in which a plurality of handwritten strokes 93 (strokes of "ABC") are drawn, and an image layer in which a plurality of images 921 and 922 are drawn is displayed. The user performs a deletion operation in which a point on the screen of the touch screen display 17 is touched by the pen 100, and is slid on the screen without detaching the pen 100 from the screen. Namely, the user inputs a stroke (hereinafter also referred to as a deletion operation stroke) 94 for designating a deletion target on the screen of the touch screen display 17.

By this deletion operation, the deletion processor 306 receives from the touch screen display 17, for example, a "touch" event corresponding to a first contact on the screen, and then receives, from the touch screen display 17, a "move" event corresponding to a second contact of sliding the position of the first contact that corresponds to the first contact operation. In accordance with the subsequent events, the deletion processor 306 can delete a plurality of elements on the document 91.

By using the contact pressure of the first contact, the deletion processor 306 selects deleting one or more elements corresponding to the first layer, and deletes a first element by using the position of the first contact. For instance, the deletion processor 306 deletes, from the document 91, the first element which is included in the one or more elements on the first layer, and at least part of which falls within a first range including the position of the first contact. After that, if the position and contact pressure of the second contact of sliding the position of the first contact are further detected and the difference (the absolute value of the difference) between the contact pressure of the first contact and that of the second contact is not greater than a third threshold, the deletion processor 306 deletes a third element included in the one or more elements corresponding to the first layer, by using the position of the second contact. For instance, the deletion processor 306 deletes, from the document 91, a third element which is included in the one or more elements corresponding to the first layer, and at least part of which falls within a second range including the position of the second contact.

In the example shown in FIG. 12, if the contact pressure of the first contact is not higher than the first threshold, the deletion processor 306 selects the handwriting layer including the handwritten strokes 93, and deletes, from the document 91, strokes 931 and 932 of "A", at least part of which falls within a deletion range 95 including the position of the first contact. If the position and contact pressure of the second contact of sliding the contact position of the first contact are further detected and the difference between the contact pressure of the first contact and that of the second contact is not greater than the third threshold, the deletion processor 306 deletes, from the document 91, strokes 933 and 934 of "B", which are included in the handwritten strokes 93 in the handwriting layer, and at least part of which falls within a deletion range 96 including the position of the second contact. Similarly, a stroke 935 of "C" may be deleted from the document 91 in accordance with a third contact (contact corresponding to the deletion operation stroke 94) subsequent to the second contact.

Furthermore, if the contact pressure of the first contact is higher than the first threshold, the deletion processor 306 selects the image layer including the images 921 and 922, and deletes, from the document 91, the image 921, at least part of which falls within the deletion range 95 including the position of the first contact. If the position and contact pressure of the second contact of sliding the contact position of the first contact are further detected and the difference between the contact pressure of the first contact and that of the second contact is not greater than the third threshold, the deletion processor 306 deletes, from the document 91, the image 922, at least part of which falls within the deletion range 96 including the position of the second contact.

Accordingly, even if, for example, the contact pressure of the second contact is higher than the first threshold after the handwriting layer is selected based on the contact pressure of the first contact that is not higher than the first threshold, the deletion processor 306 continuously selects the handwriting layer unless the difference between the contact pressure of the first contact and that of the second contact is greater than the third threshold. Further, even if the contact pressure of the second contact is not higher than the first threshold after the image layer is selected based on the contact pressure of the first contact that is higher than the first threshold, the deletion processor 306 continuously selects the image layer unless the difference between the contact pressure of the first contact and that of the second contact is greater than the third threshold. Therefore, when performing a deletion operation without detaching an external object (the pen 100) from the screen, the user can continuously instruct deletion of an element on an arbitrary layer without strictly adjusting the contact pressure after the layer is once selected, as in the case of inputting the deletion operation stroke 94.

As described above, when the deletion operation stroke 94 has been input and a change in contact pressure is not greater than the third threshold, the layer selected based on the contact pressure of a first contact included in a plurality of contacts corresponding to the deletion operation stroke 94 is maintained as the layer including an element as a deletion target. Thus, after the deletion of an element on a certain layer is started, the element on the layer can be continuously deleted without user's strictly adjusting the contact pressure of the pen 100 against the screen.

Referring then to FIG. 13, a description will be given of an example of the procedure of input control processing executed by the digital notebook application 202.

Firstly, the mode setting module 301 determines whether a mode setting operation has been performed (block B11). The mode setting module 301 detects, as a mode setting operation, an operation of depressing one button included in the buttons that are displayed on the touch screen display 17 and indicate a handwriting mode, an image mode and a deletion mode, respectively. If no mode setting operation is performed (No in block B11), processing is finished.

If a mode setting operation has been performed (Yes in block B11), it is determined whether the mode setting operation is an operation of setting the digital notebook application 202 (tablet computer 10) in the handwriting mode (block B12). If the mode setting operation is the operation of setting the digital notebook application 202 in the handwriting mode (Yes in block B12), the mode setting module 301 sets the digital notebook application 202 in the handwriting mode (block B13). Processing performed in the handwriting mode will be described later, referring to FIG. 14.

If the mode setting operation is not the operation of setting the digital notebook application 202 in the handwriting mode (No in block B12), the mode setting module 301 determines whether the mode setting operation is an operation of setting the digital notebook application 202 in the image mode (block B14). If the mode setting operation is the operation of setting the digital notebook application 202 in the image mode (Yes in block B14), the mode setting module 301 sets the digital notebook application 202 in the image mode (block B15). Processing performed in the image mode will be described later, referring to FIG. 15.

If the mode setting operation is not the operation of setting the digital notebook application 202 in the image mode (No in block B14), the mode setting module 301 determines whether the mode setting operation is an operation of setting the digital notebook application 202 in the deletion mode (block B16). If the mode setting operation is the operation of setting the digital notebook application 202 in the deletion mode (Yes in block B16), the mode setting module 301 sets the digital notebook application 202 in the deletion mode (block B17). Processing performed in the deletion mode will be described later, referring to FIG. 16.

If the mode setting operation is not the operation of setting the digital notebook application 202 in the deletion mode (No in block B16), the program is returned to block B11.

FIG. 14 shows an example of the procedure of handwriting input processing executed by the digital notebook application 202. It is assumed in the following description that a document which is being created is displayed on the screen of the LCD 17A.

Firstly, the path display processor 302 and the time-series information generator 303 determine whether the digital notebook application 202 is set in the handwriting mode (block B21). If the application 202 is not set in the handwriting mode (No in block B21), processing is finished.

If the application 202 is set in the handwriting mode (Yes in block B21), the path display processor 302 displays, on a document, the path (stroke) of the movement of the pen 100, etc. due to a handwriting input operation (block B22). In addition, the time-series information generator 303 generates the above-mentioned time-series information (a plurality of stroke data arranged chronologically) based on a sequence of coordinates corresponding to the path due to the handwriting input operation, and temporarily stores the time-series information in the work memory 401 (block B23).

FIG. 15 shows an example of the procedure of image input processing executed by the digital notebook application 202. It is assumed in the following description that a document (page) which is being created is displayed on the screen of the LCD 17A.

Firstly, the image display processor 304 and the image information generator 305 determine whether the digital notebook application 202 is set in the image mode (block B31). If the application 202 is not set in the image mode (No in block B31), processing is finished.

If the application 202 is set in the image mode (Yes in block B31), the image display processor 304 displays an image on the screen of the LCD 17A in accordance with the image input operation (block B32). This image input operation includes, for example, an operation of selecting, from a plurality of image files, an image file to be inserted in a document that is being created, and an operation of designating the position on the document in which the image is to be inserted. Further, the image information generator 305 generates image information indicating the image inserted in the document and the position (block B33).

Figure 16:
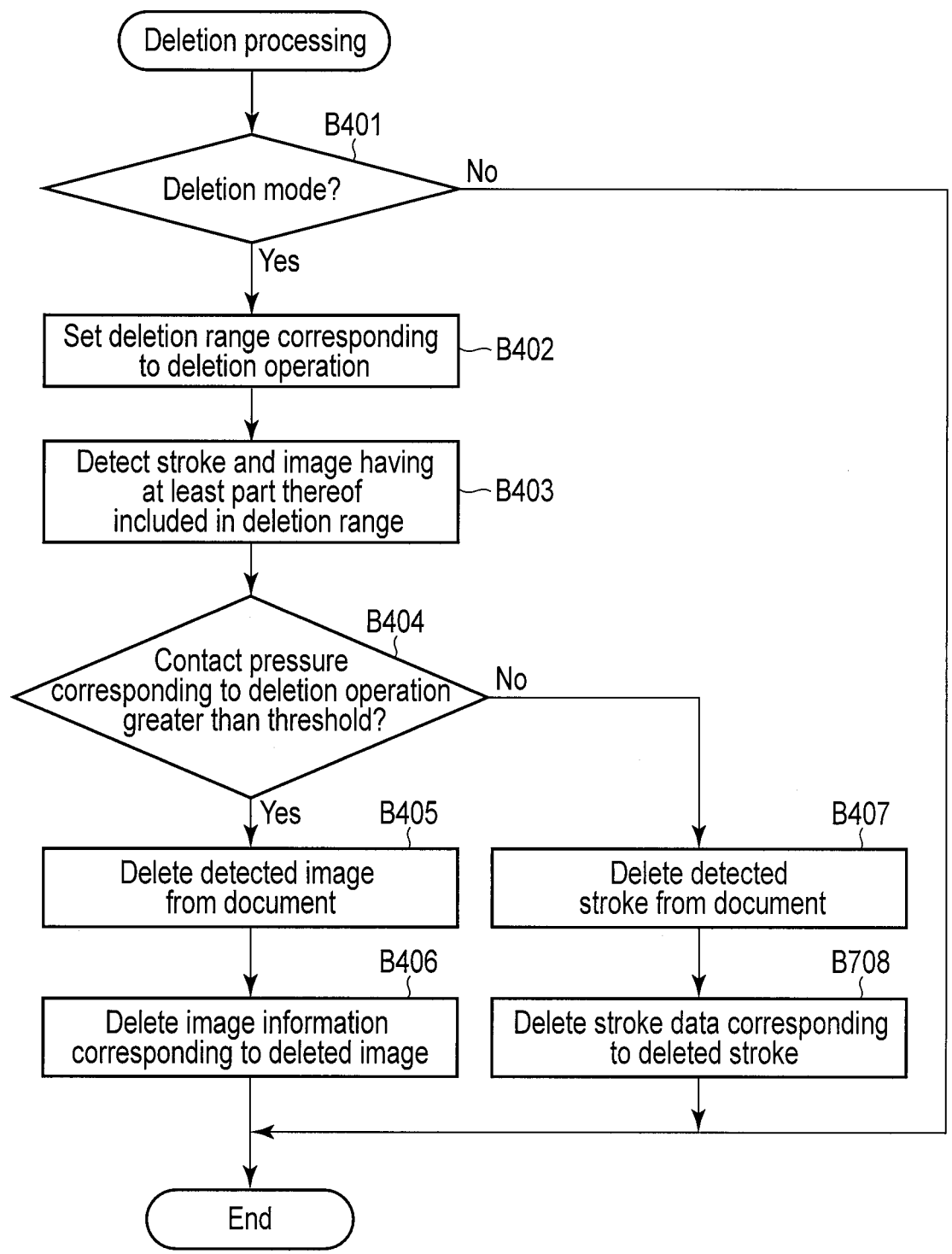
FIG. 16 is an exemplary flowchart showing the procedure of deletion processing executed by the electronic apparatus of the embodiment.

FIG. 16 shows an example of the procedure of deletion processing executed by the digital notebook application 202. It is assumed in the following description that a document including a handwritten stroke and/or an image is displayed on the screen of the LCD 17A.

Firstly, the deletion processor 306 determines whether the digital notebook application 202 is set in the deletion mode (block B401). If the application 202 is not set in the deletion mode (No in block B401), processing is finished.

If the application 202 is set in the deletion mode (Yes in block B401), the deletion processor 306 sets a deletion range corresponding to a deletion operation (block B402). The deletion operation is, for example, a touch operation or a slide operation on a document using the touch screen display 17. The deletion processor 306 sets, as the deletion range, a predetermined range (e.g., a circle with a predetermined radius) centered on the coordinates based on the coordinates corresponding to the deletion operation. After that, the deletion processor 306 detects, in the document, a handwritten stroke and an image, at least part of which falls within the deletion range (block B403).

Subsequently, it is determined whether the contact pressure corresponding to the deletion operation is greater than a first threshold (block B404). If the contact pressure is greater than the first threshold (Yes in block B404), the deletion processor 306 deletes the detected image from the screen (document) (block B405). Further, the deletion processor 306 deletes the image information corresponding to the deleted image (block B406). For instance, the deletion processor 306 deletes the entry corresponding to the deleted image from the entries of the image information stored in the work memory 401.

If the contact pressure is not greater than the first threshold (No in block B404), the deletion processor 306 deletes the detected handwritten stroke from the screen (document) (block B407). Further, the deletion processor 306 deletes the stroke data corresponding to the deleted handwritten stroke (block B408). For instance, the deletion processor 306 deletes the stroke data corresponding to the deleted handwritten stroke from the plurality of stroke data (time-series information) stored in the work memory 401.

Figure 17:
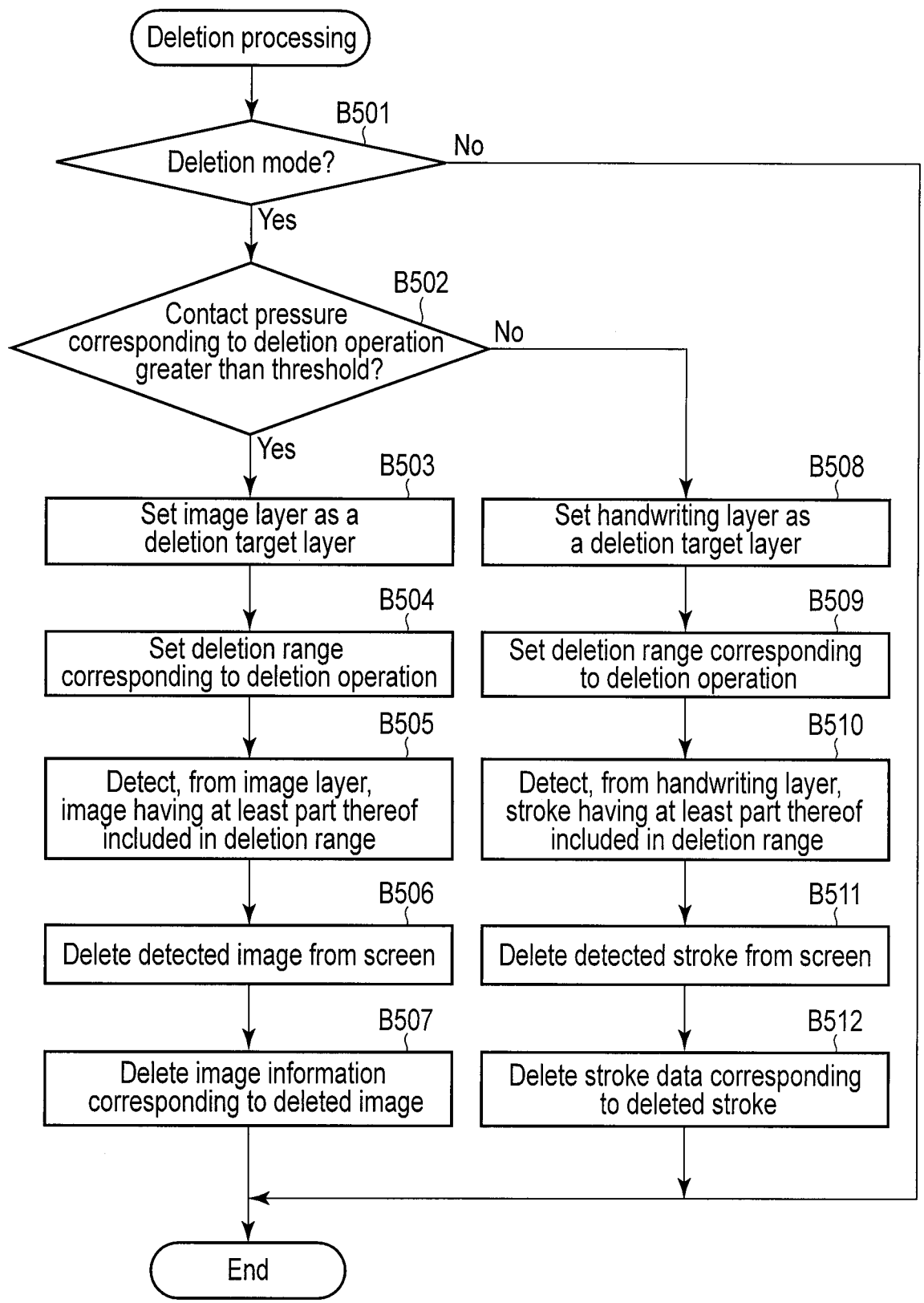
FIG. 17 is an exemplary flowchart showing another procedure of deletion processing executed by the electronic apparatus of the embodiment.

FIG. 17 shows another example of the procedure of deletion processing executed by the digital notebook application 202. It is assumed in the following description that a document, which contains a handwriting layer including one or more handwritten strokes and an image layer including one or more images, is displayed on the screen of the LCD 17A.

Firstly, the deletion processor 306 determines whether the digital notebook application 202 is set in the deletion mode (block B501). If the application 202 is not set in the deletion mode (No in block B501), processing is finished.

If the application 202 is set in the deletion mode (Yes in block B501), the deletion processor 306 determines whether the contact pressure corresponding to the deletion operation is greater than a first threshold (block B502). If the contact pressure corresponding to the deletion operation is greater than the first threshold (Yes in block B502), the deletion processor 306 sets the image layer as a deletion target layer, namely, determines the one or more images corresponding to the image layer to be deletion target elements (block B503). After that, the deletion processor 306 sets a deletion range corresponding to the deletion operation (block B504), and detects, in the image layer, an image, at least part of which falls within the deletion range (block B505). The deletion processor 306 deletes the detected image from the screen (document) (block B506). Further, the deletion processor 306 deletes the image information corresponding to the deleted image (block B507).

If the contact pressure corresponding to the deletion operation is not greater than the first threshold (No in block B502), the deletion processor 306 sets the handwriting layer as a deletion target layer, namely, determines the one or more handwritten strokes corresponding to the handwriting layer to be deletion target elements (block B508). After that, the deletion processor 306 sets a deletion range corresponding to the deletion operation (block B509), and detects, in the handwriting layer, a handwritten stroke, at least part of which falls within the deletion range (block B510). The deletion processor 306 deletes the detected handwritten stroke from the screen (document) (block B511). Further, the deletion processor 306 deletes the stroke data corresponding to the deleted handwritten stroke (block B512).

As described above, in the embodiment, when a number of types of elements exist on a document, a desired element can be deleted from the document easily. The path display processor 302 and the image display processor 304 display, on the screen of the touch screen display 17, a document that includes one or more elements corresponding to a first layer and one or more elements corresponding to a second layer. The touch screen display 17 detects the position and the contact pressure of a first contact on the screen. By using the position and the contact pressure of the first contact, the deletion processor 306 deletes either a first element corresponding to the first layer, or a second element corresponding to the second layer.

Since thus, either the first element of the first layer or the second element of the second layer can be determined to be a deletion target by the position and the contact pressure corresponding to the contact (deletion operation), the user does not have to perform such an operation as depressing a button for selecting the type of an element as a deletion target (i.e., a layer as a deletion target) and can simultaneously designate the deletion range and the type (layer) of the deletion target element by a deletion operation on the touch screen display 17.

Moreover, since each type of processing in the embodiment can be realized by a computer program, the same advantage as the embodiment can be easily obtained simply by installing the computer program into a standard computer through a computer-readable storage medium storing the computer program.

The various modules of the systems described herein can be implemented as software applications, hardware and/or software modules, or components one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a screen capable of displaying a document comprising an element of a first layer and an element of a second layer, wherein the first layer is in front of the second layer;
    a detector configured to detect a first position and a first pressure of a first contact on the screen; and
    a processor configured to:
        determine which layers comprise an element at least partially included in a first range determined in accordance with the first position;
        determine a threshold if it is determined that both the first layer and the second layer comprise an element at least partially included in the first range;
        select a first element of the first layer in the first range, if the first pressure is not greater than the threshold; and
        select a second element of the second layer in the first range, if the first pressure is greater than the threshold.

2. The electronic apparatus of claim 1, wherein the processor is further configured to delete the first element if the first pressure is not greater than the threshold, and delete the second element if the first pressure is greater than the threshold.

3. The electronic apparatus of claim 2, wherein
    the first element of the first layer is a handwritten stroke;
    the second element of the second layer is an object.

4. The electronic apparatus of claim 1, wherein the processor is configured to select deleting the first element of the first layer if the first pressure is not greater than the threshold, to select deleting the second element of the second layer if the first pressure is greater than the threshold, and to report the element selected to be deleted.

5. The electronic apparatus of claim 1, wherein
    the document comprises the first element and a third element of the first layer, and
    the processor is further configured to delete the first element if the first pressure is not greater than the threshold, and to delete the third element by using a second position of a second contact of sliding the first contact when the second position and a second pressure of the second contact are further detected and a difference between the first pressure and the second pressure is not greater than a second threshold.

6. A method of processing document data by an electronic apparatus comprising:
    displaying a document on a screen, the document comprising an element of a first layer and an element of a second layer, wherein the first layer is in front of the second layer;
    detecting a first position and a first pressure of a first contact on the screen by a detector;
    determining which layers comprise an element at least partially included in a first range determined in accordance with the first position by a processor;
    determining a threshold if it is determined that both the first layer and the second layer comprise an element at least partially included in the first range by the processor;
    selecting a first element of the first layer in the first range by the processor, if the first pressure is not greater than the threshold; and
    selecting a second element of the second layer in the first range by the processor, if the first pressure is greater than the threshold.

7. The method of claim 6, further comprising deleting the first element by the processor if the first pressure is not greater than the threshold, and deleting the second element by the processor if the first pressure is greater than the threshold.

8. The method of claim 7, wherein
the first element of the first layer is a handwritten stroke;
the second element of the second layer is an object.

9. The method of claim 6, further comprising selecting deleting the first element of the first layer by the processor if the first pressure is not greater than the threshold, selecting deleting the second element of the second layer by the processor if the first pressure is greater than the threshold, and reporting the element selected to be deleted by the processor.

10. The method of claim 6, wherein
the document comprises the first element and a third element of the first layer, and
the method further comprises deleting the first element by the processor if the first pressure is not greater than the threshold, and deleting the third element by using a second position of a second contact of sliding the first contact by the processor when the second position and a second pressure of the second contact are further detected and a difference between the first pressure and the second pressure is not greater than a second threshold.

11. A computer-readable, non-transitory storage medium having stored thereon a program which is executable by a computer, the program controlling the computer to execute functions of:
  displaying a document on a screen, the document comprising an element of a first layer and an element of a second layer, wherein the first layer is in front of the second layer;
  detecting a first position and a first pressure of a first contact on the screen;
  determining which layers comprise an element at least partially included in a first range determined in accordance with the first position;
  determining a threshold if it is determined that both the first layer and the second layer comprise an element at least partially included in the first range;
  selecting a first element of the first layer in the first range, if the first pressure is not greater than the threshold; and
  selecting a second element of the second layer in the first range, if the first pressure is greater than the threshold.

12. The storage medium of claim 11, further comprising deleting the first element if the first pressure is not greater than the threshold, and deleting the second element if the first pressure is greater than the threshold.

13. The storage medium of claim 12, wherein
the first element of the first layer is a handwritten stroke;
the second element of the second layer is an object.

14. The storage medium of claim 11, wherein the program further controls the computer to execute a function of selecting deleting the first element of the first layer if the first pressure is not greater than the threshold, selecting deleting the second element of the second layer if the first pressure is greater than the threshold, and reporting the element selected to be deleted.

15. The storage medium of claim 11, wherein
the document comprises the first element and a third element of the first layer, and
the program further controls the computer to execute a function of deleting the first element if the first pressure is not greater than the threshold, and deleting the third element by using a second position of a second contact of sliding the first contact when the second position and a second pressure of the second contact are further detected and a difference between the first pressure and the second pressure is not greater than a second threshold.

* * * * *